(12) United States Patent
Ikeda et al.

(10) Patent No.: US 8,413,318 B2
(45) Date of Patent: Apr. 9, 2013

(54) METHOD FOR MANUFACTURING ARMATURE CORE

(75) Inventors: Shinji Ikeda, Kosai (JP); Kenji Yoshimura, Toyohashi (JP); Shingo Matsuoka, Toyohashi (JP)

(73) Assignee: Asmo Co., Ltd., Shizuoka-Ken (JP)

( * ) Notice: Subject to any disclaimer, the term of this patent is extended or adjusted under 35 U.S.C. 154(b) by 77 days.

(21) Appl. No.: 13/044,116

(22) Filed: Mar. 9, 2011

(65) Prior Publication Data

US 2011/0225805 A1 Sep. 22, 2011

(30) Foreign Application Priority Data

Mar. 16, 2010 (JP) .................................. 2010-059416

(51) Int. Cl.
*H01F 7/06* (2006.01)

(52) U.S. Cl.
USPC ................ 29/606; 29/417; 29/602.1; 29/605; 336/200; 336/234

(58) Field of Classification Search ............... 29/417, 29/592.1, 602.1, 604–606; 336/200, 234
See application file for complete search history.

(56) References Cited

U.S. PATENT DOCUMENTS

| 6,658,721 B2 * | 12/2003 | Kazama et al. ............... 29/596 |
| 7,002,277 B2 * | 2/2006 | Yamamoto et al. ..... 310/216.001 |
| 2006/0279160 A1 * | 12/2006 | Yoshinaga et al. ............ 310/216 |

FOREIGN PATENT DOCUMENTS

| JP | 2000-078779 | 3/2000 |
| JP | 2003-284269 | 3/2003 |

* cited by examiner

*Primary Examiner* — Paul D Kim
(74) *Attorney, Agent, or Firm* — James R. Gourley; Colin P. Cahoon; Carstens & Cahoon, LLP

(57) ABSTRACT

A method for manufacturing an armature core is provided, in which a plurality of split cores, which are formed by laminating core pieces produced through punching by punching dies, are coupled together to form an annular shape as a whole, so as to manufacture one armature core. The method includes: preparing a plurality of sets of the split cores, each set having three split cores, so as to form one armature core; and arranging the three split cores in each set at intervals of 120° in the circumferential direction. The three split cores in each set are formed by core pieces that have been punched by the same part of the same punching die.

12 Claims, 14 Drawing Sheets

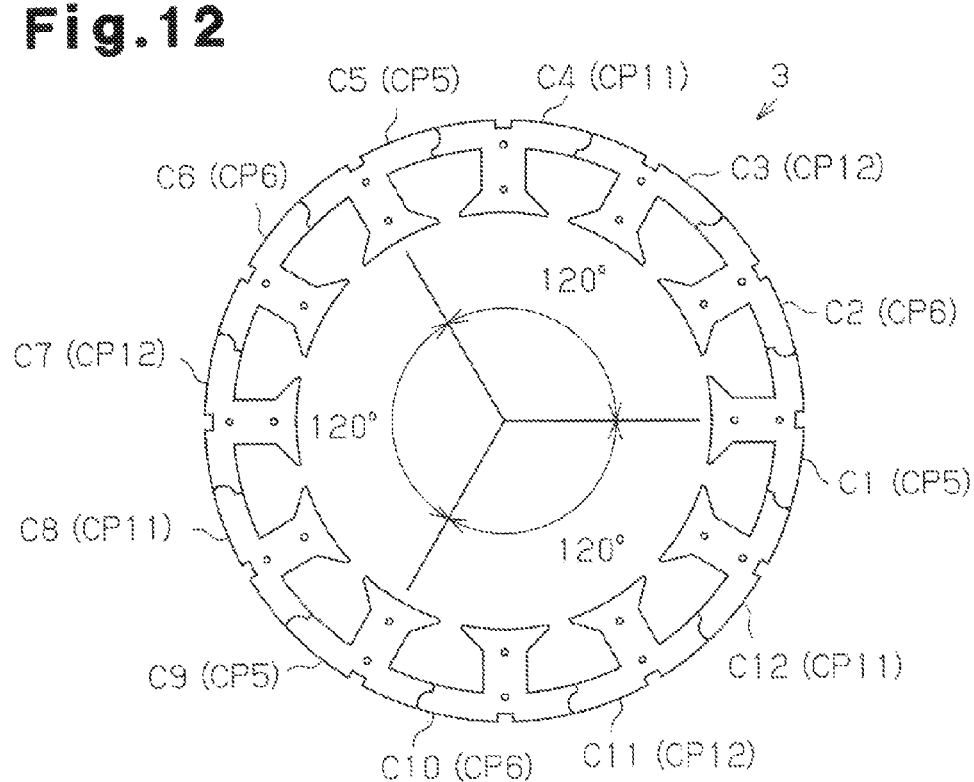

METHOD FOR MANUFACTURING ARMATURE CORE

BACKGROUND OF THE INVENTION

The present invention relates to a method for manufacturing an armature core.

Conventionally, various types of brushless motors having a split stator structure have been proposed as rotating electric machines.

Japanese Laid-Open Patent Publication No. 2003-284269 and Japanese Laid-Open Patent Publication No. 2000-78779 each disclose a brushless motor with a split core structure. In the brushless motor disclosed in either of the above publications, a stator core serving as an armature core is split into a plurality of split cores. One annular stator core is formed by combining the split cores.

In this type of brushless motor having a split core structure, the split cores need to be assembled such that the complete stator core has a high roundness, so as to reduce the cogging torque. This is because the magnetic balance needs to be maintained in order to reduce the cogging torque.

Typically, when split cores 41 forming a stator core 40 are assembled together to form an annular shape as a whole as shown in FIG. 18, the following conditions need to be met between circumferentially adjacent split cores 41 to maintain magnetic balance: (1) The distal surfaces of the teeth of circumferentially adjacent split cores 41 (corresponding to the inner circumferential surface of the stator core 40) have no displacement or a step (hereinafter, referred to as a radial direction step) $\Delta d1$ in the radial direction; (2) the clearance $\Delta d2$ between the teeth of circumferentially adjacent split cores 41 (hereinafter, referred to as an inter-teeth clearance) is constant; and (3) no clearance $\Delta d3$ exists at the abutting section X (hereinafter, referred to as an abutting section clearance) of circumferentially adjacent split cores 41.

Accordingly, for example, Japanese Laid-Open Patent Publication No. 2003-284269 discloses a technology in which the shear plane of split cores is enlarged to reduce variation of magnetic resistance, thereby reducing the cogging torque. Also, according to Japanese Laid-Open Patent Publication No. 2000-78779, each of a plurality of split cores is formed by laminating a plurality of core pieces (split core sheets) produced by punching a belt-like rolled steel plate such as a silicon steel plate, which is a material for laminated iron cores. The core pieces are laminated such that the circumferential ends of each split core have a comb-like shape. Each adjacent pair of the split cores are coupled to each other by meshing the comb-like circumferential ends with each other. This suppresses reduction in the magnetic efficiency, thereby reducing the cogging torque.

When forming a plurality of core pieces by punching a belt-like rolled steel plate, the belt-like rolled steel plate is conveyed from the upstream side to the downstream side. While being conveyed, the belt-like rolled steel plate is guided to a plurality of (for example, two) punching dies.

Then, a first punching die on the upstream side simultaneously punches core pieces in rows, which extend in the transverse direction (widthwise direction) of the rolled steel plate and spaced at predetermined intervals along the longitudinal direction. Thus, the first punching die punches core pieces at predetermined intervals along the longitudinal direction of the belt-like rolled steel plate.

After the first punching die punches core pieces, the belt-like rolled steel plate is guided to a second punching die on the downstream side. Using the areas in the longitudinal direction of the belt-lie rolled steel plate that have not been punched the first punching die (that is, the areas between the punched areas along the longitudinal direction), the second punching die simultaneously punches a plurality of core pieces.

In this manner, the core pieces are produced by alternately punching areas in the longitudinal direction of the belt-like rolled steel plate using the first punching die and the second punching die. These core pieces have a great variation in the dimensional accuracy.

This is because the second punching die punches the rolled steel plate after the rigidity of the plate has been lowered by the first punching die, which has punched core pieces. As a result, the dimensional accuracy of the core pieces produced by the second punching die is significantly worse than the dimensional accuracy of the core pieces produced by the first punching die.

Even if maintenance of the second punching die is frequently preformed, the above described deterioration of the dimensional accuracy cannot be avoided due to the limitations of the accuracy maintenance. Thus, the radial direction steps $\Delta d1$, the inter-teeth clearances $\Delta d2$, and the abutting section clearances $\Delta d3$ cannot be made uniform. It is therefore desired that cogging torque due to variations in dimensional accuracy, which is unavoidable during production, be reduced.

SUMMARY OF THE INVENTION

Accordingly, it is an objective of the present invention to provide a method for manufacturing an armature core that reduces cogging torque due to variations in dimensional accuracy of core pieces forming split cores.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which,

DETAILED DESCRIPTION OF THE PREFERRED EMBODIMENTS

Figure 1:
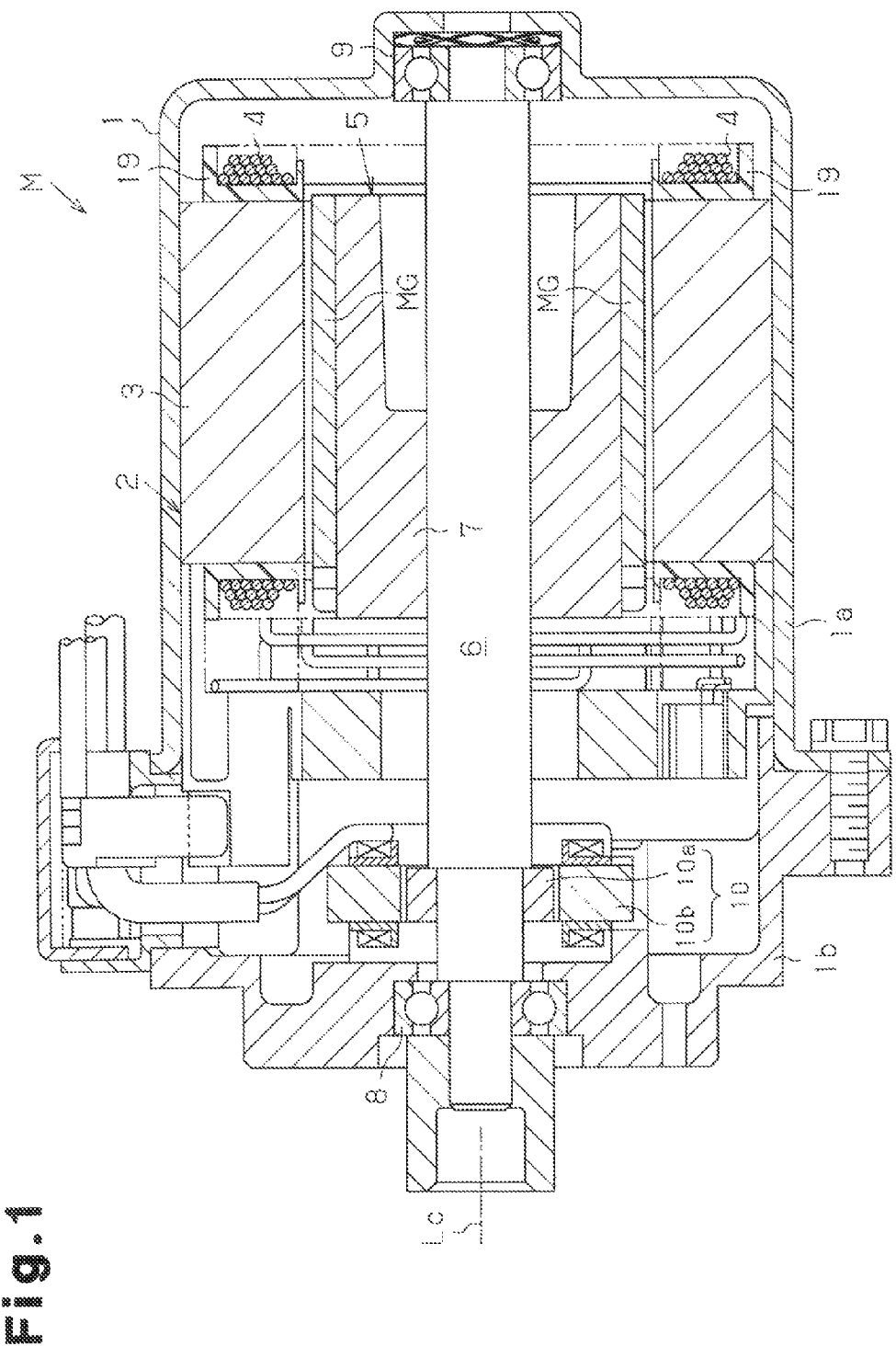
Figure 2:
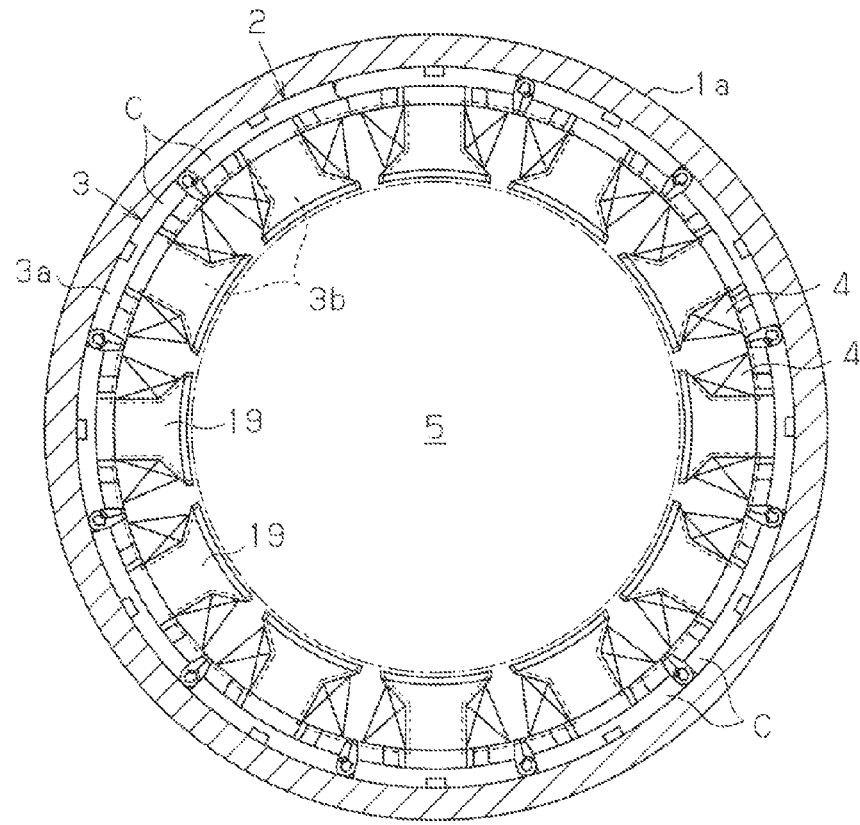
Figure 3:
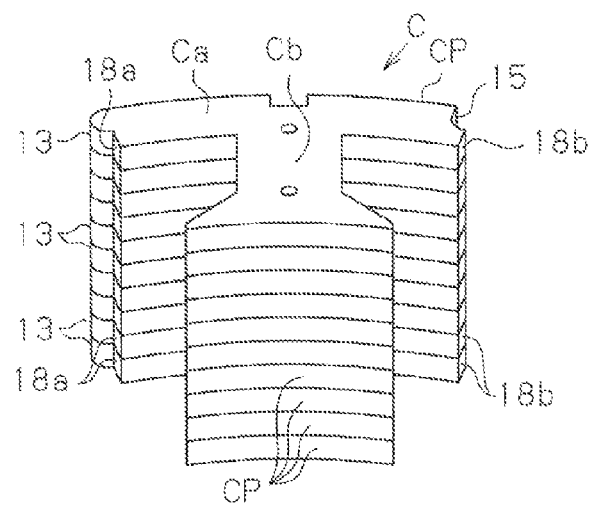
Figure 4A:
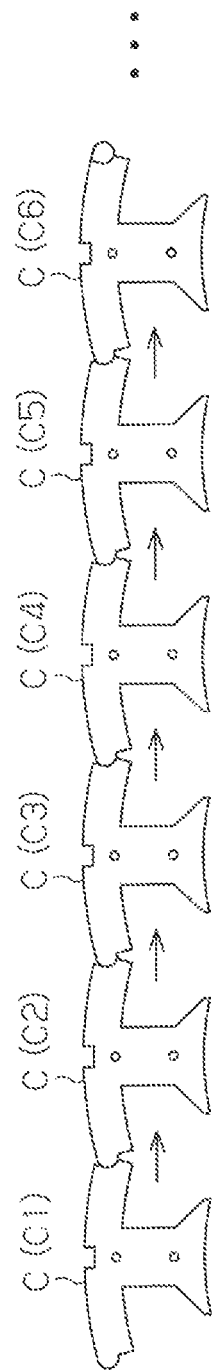
Figure 4B:
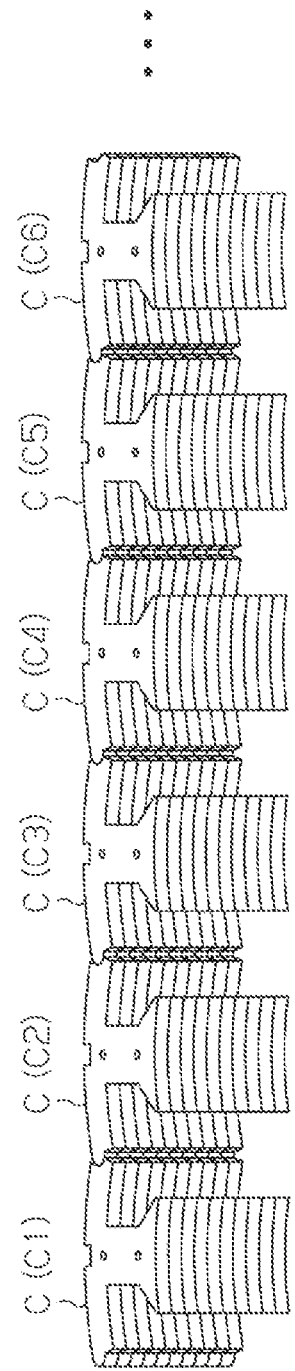
Figure 5A:
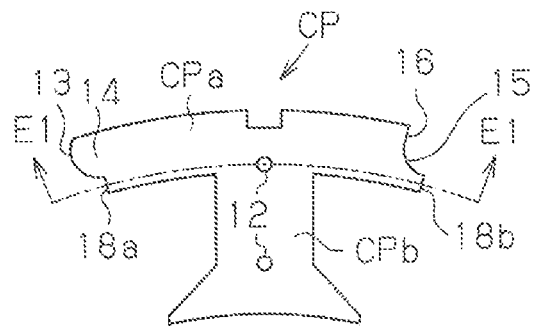
Figure 5B:
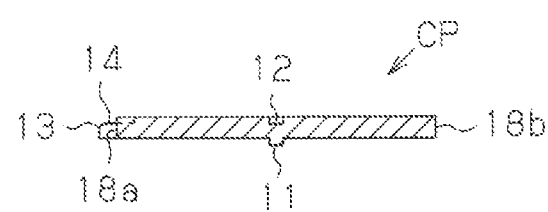
Figure 6:
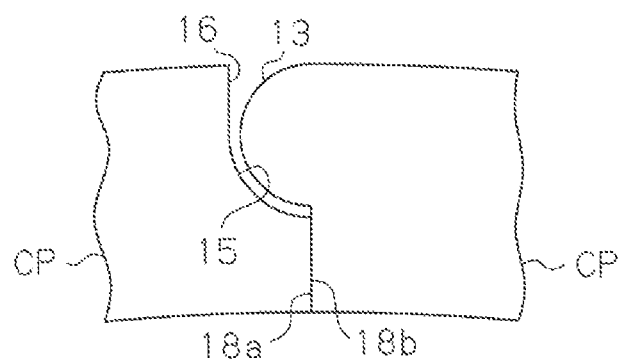
Figure 7:
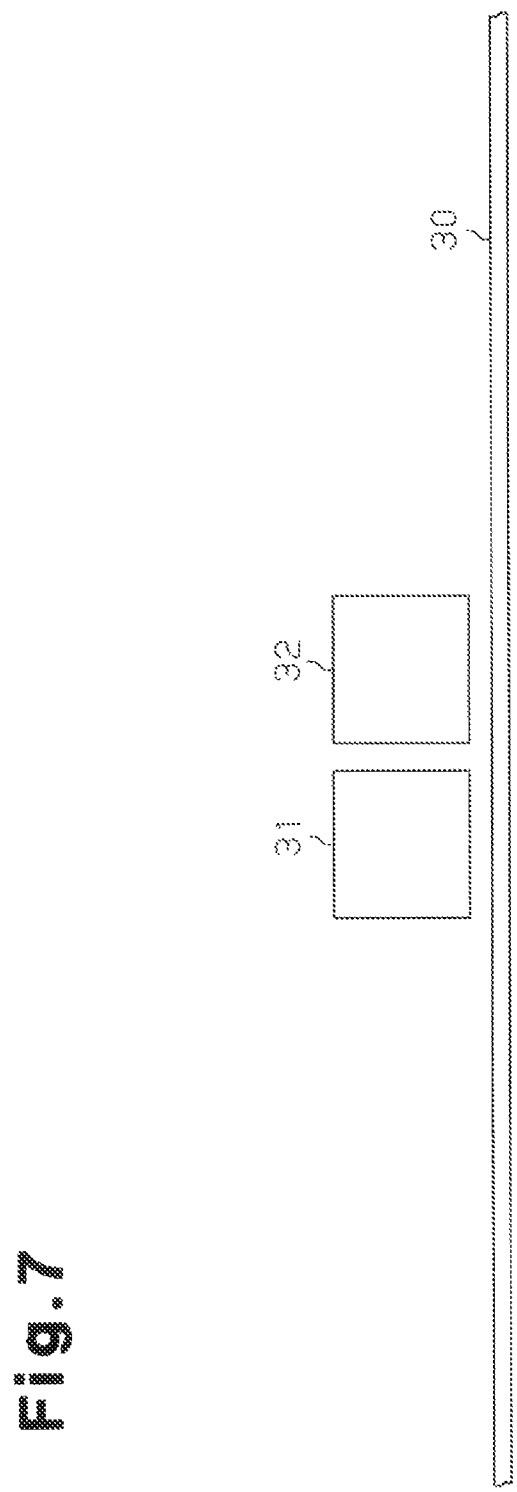
Figure 8:
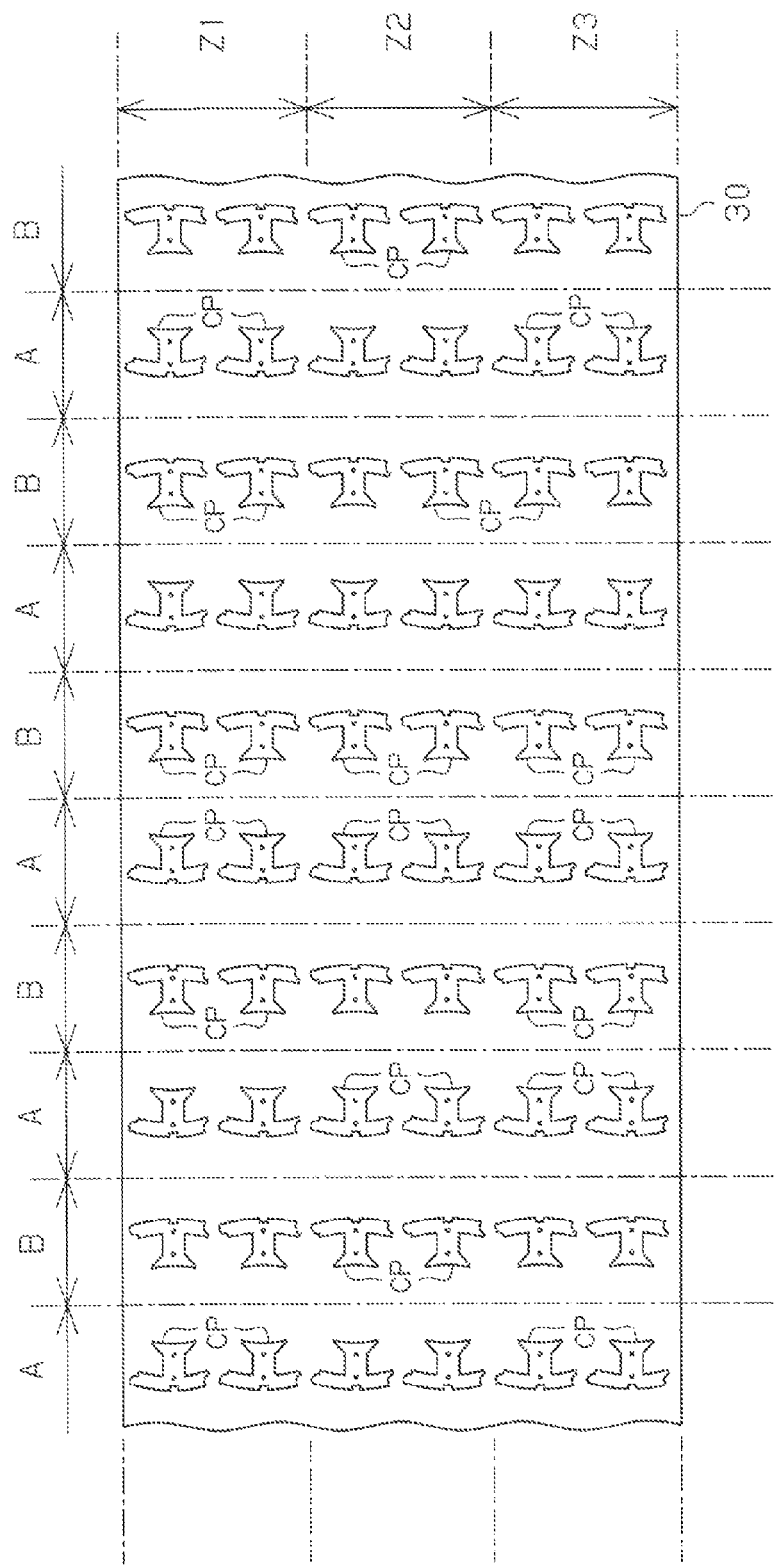
Figure 9:
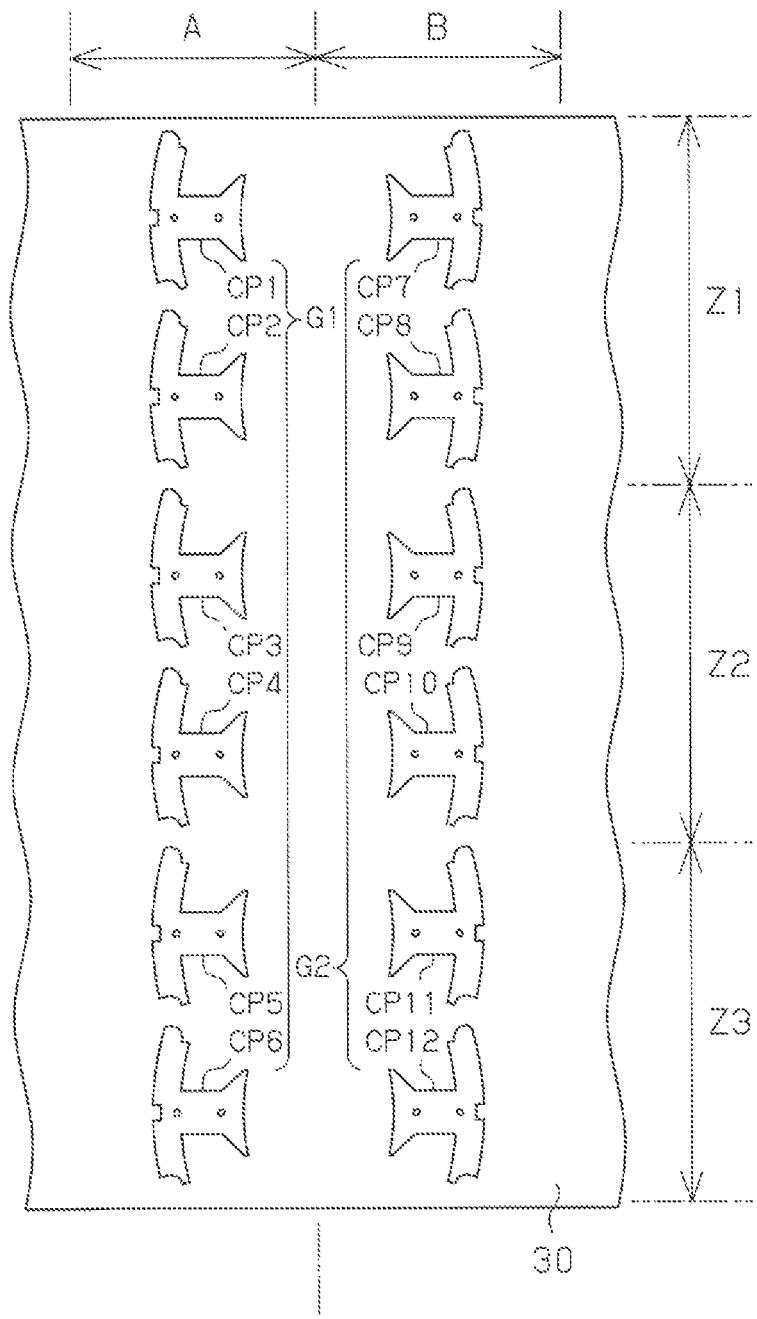
Figure 10:
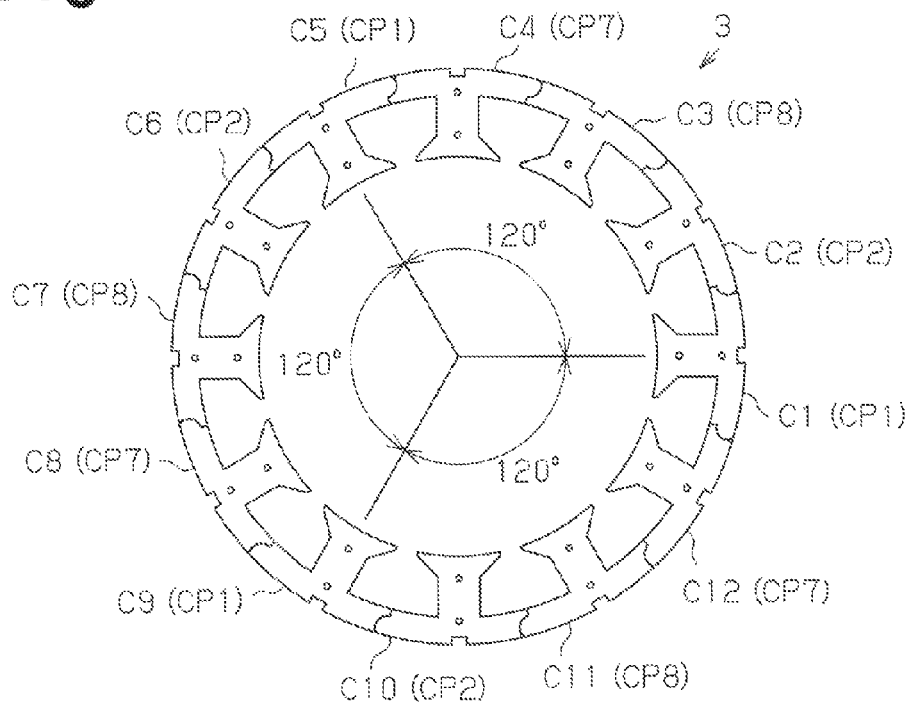
Figure 11:
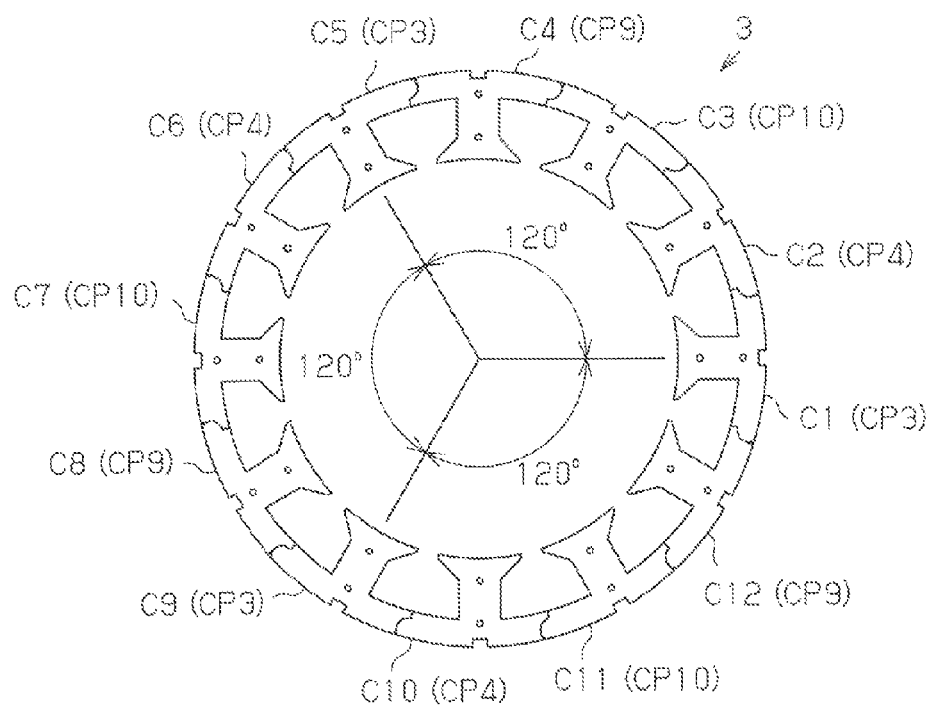
Figure 13A:
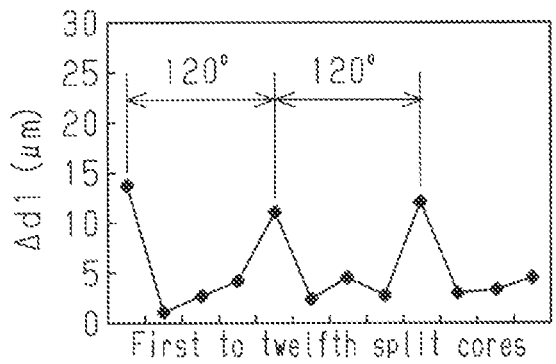
Figure 13B:
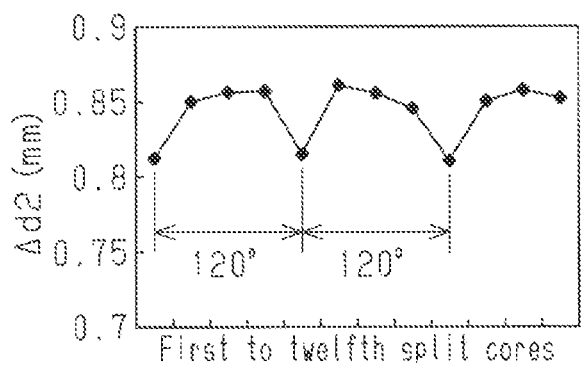
Figure 13C:
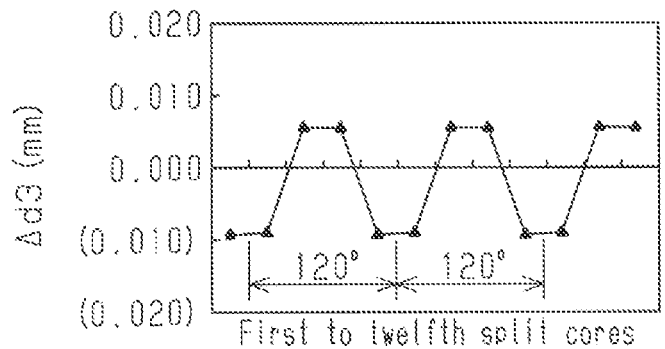
Figure 14A:
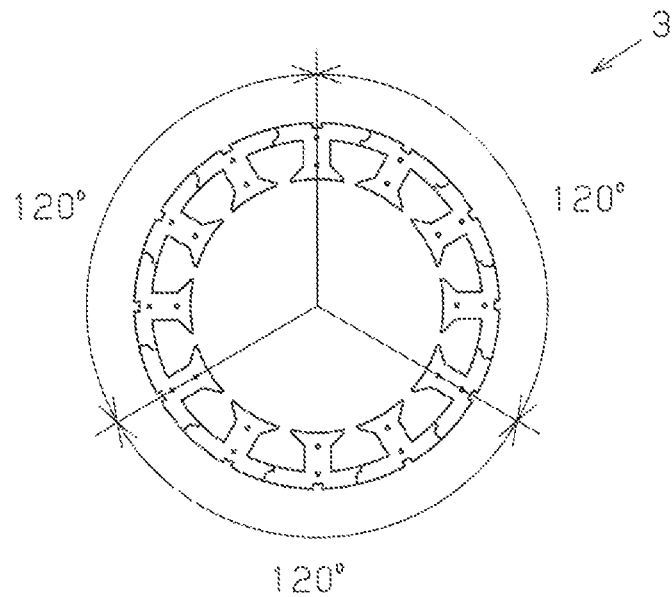
Figure 14B:
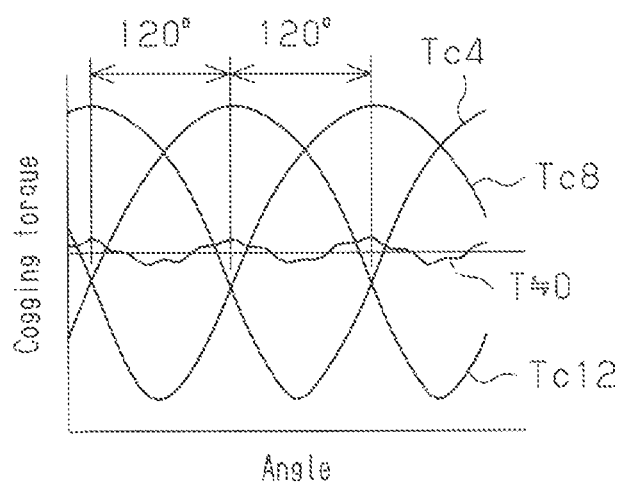
Figure 15:
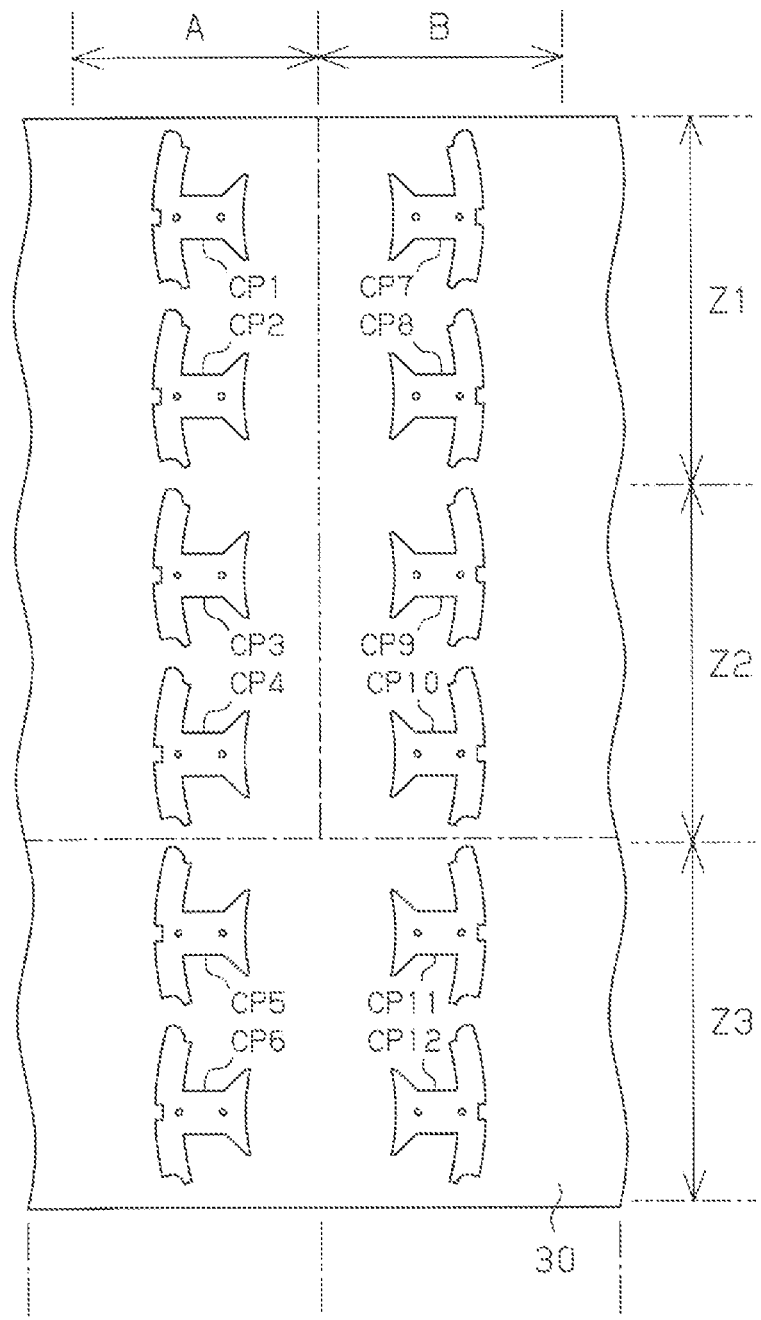
Figure 16:
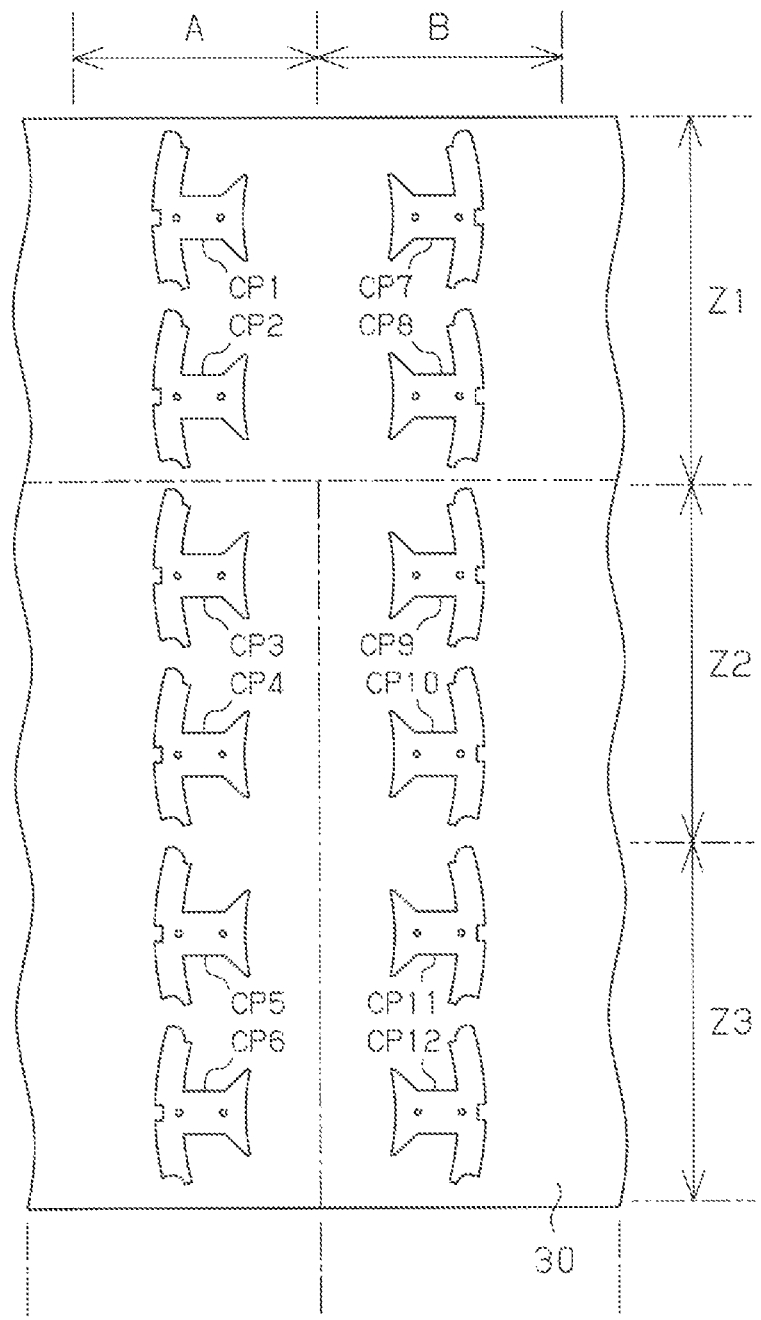
Figure 17:
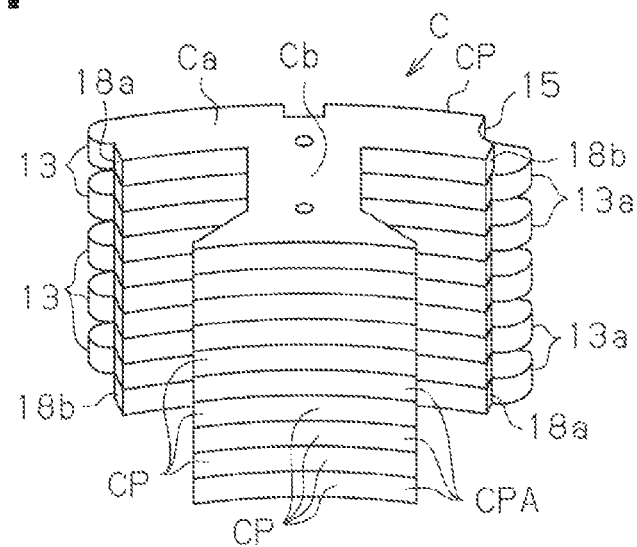
Figure 18:
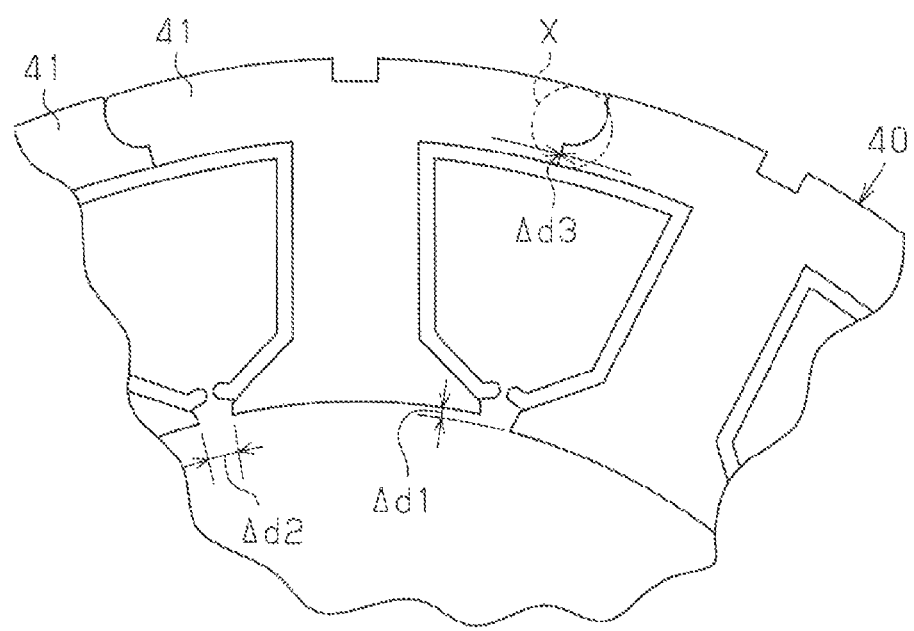

FIG. 1 is a cross-sectional view along the axial direction, illustrating a brushless motor according to one embodiment of the present invention;

FIG. 2 is a cross-sectional view along the radial direction, illustrating the brushless motor of FIG. 1;

FIG. 3 is a perspective view for explanatory illustration of split cores in the brushless motor of FIG. 1;

FIG. 4A is a plan view illustrating a developed state the stator core;

FIG. 4B is a perspective view of the stator core of FIG. 4A;

FIG. 5A is a front view of a core piece, which forms the split core of FIG. 3;

FIG. 5B is a cross-sectional view of the core piece of FIG. 5A;

FIG. 6 is an enlarged plan view showing a coupling section of a split core and another split core;

FIG. 7 is a diagram for explanatory illustration of a method for manufacturing core pieces;

FIG. 8 is a front view for explanatory illustration of a rolled steel plate, from which core pieces are punched;

FIG. 9 is an enlarged front view of the rolled steel plate, from which core pieces are punched;

FIG. 10 is a front view showing a stator core that is formed by joining split cores formed by first, second, seventh, and eighth core pieces, respectively;

FIG. 11 is a front view showing a stator core that is formed by joining split cores formed by third, fourth, ninth, and ten core pieces, respectively;

FIG. 12 is a front view showing a stator core that is formed by joining split cores formed by fifth, sixth, eleventh, and twelfth core pieces, respectively;

FIGS. 13A to 13C are graphs showing radial direction steps, inter-teeth clearances, and abutting section clearances in the stator core formed by first to twelfth split cores;

FIG. 14A is a front view of the stator core for explanatory illustration of cogging torque;

FIG. 14B is a waveform chart for explanatory illustration of cogging torque;

FIG. 15 is an enlarged partial front view of a rolled steel plate, from which core pieces are punched, according to a modification of the present invention;

FIG. 16 is an enlarged partial front view of a rolled steel plate, from which core pieces are punched, according to a modification of the present invention;

FIG. 17 is a perspective view for explanatory illustration of a modification of a split core according to a modification of the present invention; and FIG. 18 is a diagram for explanatory illustration of a radial direction step, an inter-teeth clearance, and an abutting section clearance.

DESCRIPTION OF THE PREFERRED EMBODIMENTS

A brushless motor M mounted to an electric power steering (EPS) device according to one embodiment of the present invention will now be described with reference to the drawings.

In FIG. 1, the outer shell of the brushless motor M is formed by a metal cylindrical motor housing 1, which is a yoke housing. The motor housing 1 includes a rear housing member 1a, which is a cylindrical yoke with a bottom, and a disk-shaped front housing member 1b, which closes the opening of the rear housing member 1a. The housing members 1a, 1b are fastened to each other.

The motor housing 1 incorporates an annular stator 2 that is arranged along the inner circumferential surface of the rear housing member 1a.

The stator 2 includes a stator core 3, which serves as an armature core. As shown in FIG. 2, the stator core 3 includes an annular portion 3a fixed to the rear housing member and a plurality of tooth portions 3b extending radially inward from the annular portion 3a. In the present embodiment, twelve tooth portions 3b are formed to be spaced at equal angular intervals (30 degrees) along the circumferential direction.

Accordingly, twelve tooth portions 3b are arranged to form an annular shape, so that twelve slots are defined between circumferentially adjacent tooth portions 3b. Coils 4 are wound about the tooth portions 3b, and a three-phase alternating current is supplied to the coils 4.

As shown in FIG. 1, a rotor 5 is rotatably arranged radially inside of the stator 2. The rotor 5 includes a rotary shaft 6 and a columnar rotor core 7 fixed to the rotary shaft 6. The rotary shaft 6 is arranged such that its central axis Lc is aligned with the central axis of the annular stator 2. Axially ends of the rotary shaft 6 are rotatably supported by bearings 8, 9 located in the motor housing 1. Accordingly, the rotor 5 (the rotor core 7) is supported at a position radially inside of the stator 2 to be rotatable about the central axis Lc.

The rotor core 7 has a columnar shape and flat-plate shaped permanent magnets MG (twelve, in the present embodiment), which are fixed to the outer circumference thereof at predetermined intervals along the circumferential direction.

A sensor rotor 10a is fixed to a part of the rotary shaft 6 that is close to the front housing member 1b. A sensor stator 10b is fixed to a part of the front housing member 1b that faces the sensor rotor 10a. The sensor rotor 10a and the sensor stator 10b form a resolver 10. The resolver 10 outputs detection signals that correspond to the rotational position of the rotor 5. Based on the detection signals, a drive current to be supplied to the coils 4 wound about the stator 2 is generated.

The stator 2 of the present embodiment has a split stator structure. That is, the stator core 3 is split into twelve sections, or twelve split cores C arranged along the circumferential direction. Each split core C has one of the tooth portions 3b.

For purposes of illustration, the twelve split cores C are referred to as first to twelfth split cores C1 to C12, so that the split cores C are distinguished from one another. In each of the first to twelfth split cores C1 to C12, a part that forms the annular portion 3a of the stator core 3 is referred to as a split annular portion Ca, and a part that forms the tooth portion 3b of the stator core 3 is referred to as a split tooth portion Cb.

The first to twelfth split cores C1 to C12 are each formed by laminating plate-like core pieces CP, and are coupled together to form an annular shape as a whole to form the stator core 3.

FIGS. 5A and 5B shows one of the core pieces CP forming split cores C1 to C12. Each core piece CP has an annular piece portion CPa for forming the split annular portion Ca of the first to twelfth split cores C1 to C12, and a tooth piece portion CPb for forming the split tooth portion Cb of the first to twelfth split cores C1 to C12.

A first fitting projection 11 is formed on a first surface of the tooth piece portion CPb, and a first fitting recess 12 is formed on a second surface of the tooth piece portion CPb. The first fitting recess 12 and the first fitting projection 11 are at corresponding positions along the direction of the thickness of the plate. When two core pieces CP are laminated, that is, superposed onto each other, the first fitting projection 11 formed in the tooth piece portion CPb of one of the core pieces CP is fitted in the first fitting recess 12 formed in the other core piece CP, so that the relative positions of the laminated core pieces CP are determined without displacement.

An arcuate projection 13 is formed at a first circumferential end of each annular piece portion CPa. The arcuate projection 13 has an arc the central angle of which is approximately 180 degrees (about a half a circle). Each core piece CP is shaped like a flat plate, and its upper surface (a second surface) and its lower surface (a first surface) are each formed as a single flat surface.

An arcuate recess 15 is formed at a second circumferential end of each annular piece portion CPa. The arcuate recess 15 has an arc the central angle of which is approximately 90 degrees (about a quarter of a circle). A straight portion 16 is formed to be continuous from the arcuate recess 15. The straight portion 16 extends radially outward in the annular portion 3a of the stator core 3. The straight portions 16 allow the arcuate projections 13 of the core pieces CP of a laminated split core C to be received in the arcuate recesses 15 of other laminated core pieces CP that form another split core P from the radially outside.

Contact surfaces 18a, 18b are formed at circumferential ends of the core pieces CP at positions radially inward of the arcuate projection 13 and the arcuate recess 15, respectively. With the first to twelfth split cores C1 to C12 combined together to form the annular stator core 3, each adjacent pairs of the first to twelfth split cores C1 to C12 contact each other at the contact surfaces 18a, 18b. The contact surfaces 18a, 18b are formed by a flat surface extending along straight lines extending along the radial direction of the annular portion 3a of the stator core 3. As shown in FIG. 6, the centers of the arcuate projection 13 and the arcuate recess 15 are located on extended lines of the contact surfaces 18a, 18b.

According to the structure of the core piece CP described above, the arcuate projection 13 of a core piece CP is fitted to the arcuate recess 15 of an adjacent core piece CP, so that the contact surfaces 18a, 18b of the adjacent core pieces CP contact each other.

As shown in FIG. 6, the arcuate projection 13 of each core piece CP of each split core C is fitted in the arcuate recess 15 of the adjacent core piece CP, so as to combine a plurality of (twelve) core pieces C1 to C12 together.

An insulator 19 is attached to each of the first to twelfth split cores C1 to C12 (refer to FIGS. 1 and 2). Then, with the split cores C1 to C12 arranged linearly (see FIG. 4), the coils 4 are wound about the split tooth portions Cb of the split cores C1 to C12. Thereafter, to obtain an annular stator 2, the split cores C1 to C12 are made to have an annular shape. That is, each insulator 19 has a pivotable coupling portion to pivotably couple each adjacent pair of the split cores C1 to C12. Each adjacent pair of the split cores C1 to C12 are pivoted relative to each other so that the split cores C1 to C12, which are held in a coupled state by the insulators 19, to obtain the annular stator 2.

A method for manufacturing the core pieces CP will now be described. The core pieces CP are manufactured by punching, with punching dies, a belt-like rolled steel plate, such as a silicon steel plate, which is a material for laminated iron cores.

FIG. 7 is a diagram for explanatory illustration of a method for manufacturing the core pieces CP, and FIG. 8 is a front view for explanatory illustration of a belt-like rolled steel plate 30, from which the core pieces CP are punched.

In FIG. 7, the belt-like rolled steel plate 30 is conveyed from an upstream side to a downstream side (from left to right, as viewed in FIG. 7). Two punching dies, or a first punching die 31 and a second punching die 32, are sequentially arranged in the conveying path of the rolled steel plate 30. The rolled steel plate 30 is sequentially guided to and punched by the first punching die 31 and the second punching die 32.

The belt-like rolled steel plate 30 is a silicon steel plate, which is a material forming a laminated iron core. As shown in FIG. 8, six core pieces CP along the transverse direction (widthwise direction, a second direction) are punched simultaneously.

Specifically, the belt-like rolled steel plate 30 has first areas A and second areas B alternately arranged along the longitudinal direction (first direction). The first punching die 31 and the second punching die 32 produce six core pieces using a first area A and a second area B, respectively.

That is, first, the first punching die 31 punches a first area A to simultaneously produce six core pieces CP. Thereafter, a second area B is guided to the second punching die 32, which in turn punches the second area B to simultaneously produce six core pieces CP. These processes are repeated to produce core pieces CP.

The core pieces CP, which are alternately produced by the first punching die 31 and the second punching die 32 have a significant difference in dimensional accuracy. This is because the second punching die 32 punches the rolled steel plate 30 the rigidity of which has been lowered by the first punching die 31, which has punched core pieces CP.

If the core pieces CP with such great dimensional errors are laminated to form the first to twelfth split core pieces C1 to C12 without taking into consideration the errors, the first to twelfth split cores C1 to C12 all have different dimensions and shapes. As a result, if the first to twelfth split cores C1 to C12 are used to form the stator core 3, the magnetic imbalance is caused by variation in the dimensional accuracy. This in turn increases the cogging torque.

Accordingly, in the present embodiment, the split cores C are formed and arranged taking into consideration the dimensional accuracy of the core pieces CP produced by the first punching die 31 and the second punching die 32, thereby eliminating magnetic imbalance caused by unavoidable variation in the dimensional accuracy.

Hereinafter, a method for forming split cores C and a method for arranging the split cores C will be described.

For purposes of illustration, the core pieces CP produced by punching by the first punching die 31 and the second punching die 32 will hereafter be expressed by first to twelfth core pieces CP1 to CP12, by adding numbers 1 to 12 to the symbol CP.

Referring to FIGS. 8 and 9, the first punching die 31 simultaneously punches six core pieces CP (a first core piece group G1) in each first area A. These core pieces CP in each first area A are referred to as first to sixth core pieces CP1 to CP6 sequentially from top to bottom as viewed in FIG. 9. Likewise, the second punching die 32 simultaneously punches six core pieces CP (a second core piece group G2) in each second area B. These core pieces CP in each second area B are referred to as seventh to twelfth core pieces CP7 to CP12 sequentially from top to bottom as viewed in FIG. 9.

In the rolled steel plate 30, the pair of the first core piece CP1 and the seventh core piece CP7, the pair of the second core piece CP2 and the eighth core piece CP8, and the pair of the third core piece CP3 and the ninth core piece CP9 are each punched at facing positions. Likewise, in the rolled steel plate 30, the pair of the fourth core piece CP4 and the tenth core piece CP10, the pair of the fifth core piece CP5 and the eleventh core piece CP11, and the pair of the sixth core piece CP6 and the twelfth core piece CP12 are each punched at facing positions.

The belt-like rolled steel plate 30 is divided into three areas in the transverse direction (the widthwise direction). The left side (the upper side in FIGS. 8 and 9) is defined as a left area Z1, the middle is defined as a middle area Z2, and the right side (the lower side in FIGS. 8 and 9) is defined as a right area Z3.

In the first and second areas A and B, the first core piece CP1, the second core piece CP2, the seventh core piece CP7, and the eighth core piece CP8, which are formed in the left area Z1 extending along the longitudinal direction, are used to form first to twelfth split cores C1 to C12 to form one stator core 3.

In the first and second areas A and B, the third core piece CP3, the fourth core piece CP4, the ninth core piece CP9, and the tenth core piece CP10, which are formed in the middle area Z2 extending along the longitudinal direction, are used to form first to twelfth split cores C1 to C12 to form one stator core 3.

Further, in the first and second areas A and B, the fifth core piece CP5, the sixth core piece CP6, the eleventh core piece CP11, and the twelfth core piece CP12, which are formed in the right area Z3 extending along the longitudinal direction, are used to form first to twelfth split cores C1 to C12 to form one stator core 3.

That is, the first core pieces CP1, the second core pieces CP2, the seventh core pieces CP7, and the eighth core pieces CP8, which are formed in the first area A and the second area B overlapping the left area Z1 are separately laminated to form split cores C1 to C12.

Specifically, three split cores C are formed using only the first core pieces CP1 of the first areas A. Also, three split cores C are formed using only the second core pieces CP2. Further, three split cores C are formed using only the seventh core pieces CP7. Three split cores C are formed using only the eighth core pieces CP8.

The three split cores C formed using only the first core pieces CP1 are used as first, fifth, and ninth split cores C1, C5, and C9. The three split cores C formed using only the second core pieces CP2 are used as second, sixth, and tenth split cores C2, C6, and C10. Also, the three split cores C formed using only the seventh core pieces CP7 are used as fourth, eighth, and twelfth split cores C4, C8, and C12. Further, the three split cores C formed using only the eighth core pieces CP8 are used as third, seventh, and eleventh split cores C3, C7, and C11.

In this manner, the first to twelfth split cores C1 to C12 formed by the core pieces CP1, CP2, CP7, and CP8 are coupled together in the order of the first split core C1, the second split core C2, . . . , the eleventh split core C11, and the twelfth split core C12 as shown in FIGS. 4A and 4B. Finally, the first split core C1 and the twelfth split core C12 are coupled to each other to form one annular stator core 3 without coils 4 wound thereabout as shown in FIG. 10.

In the stator core 3, the first, fifth, and ninth split cores C1, C5 and C9, which are formed by only the first core pieces CP1, are arranged at equal angular intervals of 120° along the circumferential direction. Likewise, the second, sixth, and tenth split cores C2, C6 and C10, which are formed by only the second core pieces CP2, are arranged at equal angular intervals of 120° along the circumferential direction. Also, the fourth, eighth, and twelfth split cores C4, C8 and C12, which are formed by only the seventh core pieces CP7, are arranged at equal angular intervals of 120° along the circumferential direction. Further, the third, seventh, and eleventh split cores C3, C7 and C11, which are formed by only the eighth core pieces CP8, are arranged at equal angular intervals of 120° along the circumferential direction.

That is, in the annular stator core 3, the three split cores C (C1, C5, C9) formed only by the first core pieces CP1, the three split cores C (C2, C6, C10) formed only by the second core pieces CP2, the three split cores C (C4, C8, C12) formed only by the seventh core pieces CP7, and the three split cores C (C3, C7, C11) formed only by the eighth core pieces CP8 are not unevenly arranged along the circumferential direction, but are evenly arranged at equal angular intervals of 120° along the circumferential direction.

The first core piece CP1, the second core piece CP2, the seventh core piece CP7, and the eighth core piece CP8 each have dimensional errors. Therefore, the split cores C (C1, C5, C9) formed by the first core pieces CP1, the split cores C (C2, C6, C10) formed by the second core pieces CP2, the split cores C (C4, C8, C12) formed by the seventh core pieces CP7, and the split cores C (C3, C7, C11) formed by the eighth core pieces CP8 have dimensional errors. As a result, the radial direction step Δd1, the inter-teeth clearances Δd2, and the abutting section clearances Δd3 between adjacent split cores C in the stator core 3 are uneven.

However, since the split cores C (C1, C5, C9) formed by the first core pieces CP1, the split cores C (C2, C6, C10) formed by the second core pieces CP2, the split cores C (C4, C8, C12) formed by the seventh core pieces CP7, and the split cores C (C3, C7, C11) formed by the eighth core pieces CP8 are each arranged at equal angular intervals of 120° along the circumferential direction, the radial direction steps Δd1, the inter-teeth clearances Δd2, and the abutting section clearances Δd3 are each equalized at equal angular intervals of 120°. This improves the balance of the magnetic resistance.

Also, the third core pieces CP3, the fourth core pieces CP4, the ninth core pieces CP9, the tenth core pieces CP10, which are formed in the first area A and the second area B overlapping the middle area Z2 are separately laminated to form split cores C1 to C12.

Specifically, three split cores C are formed using only the third core pieces CP3. Three split cores C are formed using only the fourth core pieces CP4. Also, three split cores C are formed using only the ninth core pieces CP9. Further, three split cores C are formed using only the tenth core pieces CP10.

The three split cores C formed using only the third core pieces CP3 are used as first, fifth, and ninth split cores C1, C5, C9. The three split cores C formed using only the fourth core pieces CP4 are used as second, sixth, and tenth split cores C2, C6, and C10. Also, the three split cores C formed using only the ninth core pieces CP9 are used as fourth, eighth, and twelfth split cores C4, C8, and C12. Further, the three split cores C formed using only the tenth core pieces CP10 are used as third, seventh, and eleventh split cores C3, C7, and C11.

In this manner, the first to twelfth split cores C1 to C12 formed by the core pieces CP3, CP4, CP9, and CP10 are coupled together in the order of the first split core C1, the second split core C2, . . . , the eleventh split core C11, and the twelfth split core C12. Finally, the first split core C1 and the twelfth split core C12 are coupled to each other to form one annular stator core 3 without coils 4 wound thereabout as shown in FIG. 10.

In the stator core 3, the first, fifth, and ninth split cores C1, C5 and C9, which are formed by only the third core pieces CP3, are arranged at equal angular intervals of 120° along the circumferential direction. Likewise, the second, sixth, and tenth split cores C4, C6 and C10, which are formed by only the fourth core pieces CP4, are arranged at equal angular intervals of 120° along the circumferential direction. Also, the fourth, eighth, and twelfth split cores C4, C8 and C12, which are formed by only the ninth core pieces CP9, are arranged at equal angular intervals of 120° along the circumferential direction. Further, the third, seventh, and eleventh split cores C3, C7 and C11, which are formed by only the tenth core pieces CP10, are arranged at equal angular intervals of 120° along the circumferential direction.

Therefore, in this stator core 3 also, the radial direction steps Δd1, the inter-teeth clearances Δd2, and the abutting section clearances Δd3 between adjacent split cores are each equalized at equal angular intervals of 120°, so that the balance of the magnetic balance is improved.

Further, the fifth core pieces CP5, the sixth core pieces CP6, the eleventh core pieces CP11, the twelfth core pieces CP12, which are formed in the first area A and the second area B overlapping the right area Z3, are separately laminated to form split cores C1 to C12.

Specifically, three split cores C are formed using only the fifth core pieces CP5. Three split cores C are formed using only the sixth core pieces CP6. Also, three split cores C are formed using only the eleventh core pieces CP11. Further, three split cores C are formed using only the twelfth core pieces CP12.

The three split cores C formed using only the fifth core pieces CP5 are used as first, fifth, and ninth split cores C1, C5, C9. The three split cores C formed using only the sixth core pieces CP6 are used as second, sixth, and tenth split cores C2, C6, and C10. Also, the three split cores C formed using only the eleventh core pieces CP11 are used as fourth, eighth, and twelfth split cores C4, C8, and C12. Further, the three split cores C formed using only the twelfth core pieces CP12 are used as third, seventh, and eleventh split cores C3, C7, and C11.

In this manner, the first to twelfth split cores C1 to C12 formed by the core pieces CP5, CP6, CP11, and CP12 are coupled together in the order of the first split core C1, the second split core C2, . . . , the eleventh split core C11, and the twelfth split core C12. Finally, the first split core C1 and the twelfth split core C12 are coupled to each other to form one annular stator core 3 without coils 4 wound thereabout as shown in FIG. 12.

In the stator core 3, the first, fifth, and ninth split cores C1, C5 and C9, which are formed by only the fifth core pieces CP5, are arranged at equal angular intervals of 120° along the circumferential direction. Likewise, the second, sixth, and tenth split cores C2, C6 and C10, which are formed by only the sixth core pieces CP6, are arranged at equal angular intervals of 120° along the circumferential direction. Also, the fourth, eighth, and twelfth split cores C4, C8 and C12, which are formed by only the eleventh core pieces CP11, are arranged at equal angular intervals of 120° along the circumferential direction. Further, the third, seventh, and eleventh split cores C3, C7 and C11, which are formed by only the twelfth core pieces CP12, are arranged at equal angular intervals of 120° along the circumferential direction.

Therefore, in this stator core 3 also, the radial direction steps Δd1, the inter-teeth clearances Δd2, and the abutting section clearances Δd3 between adjacent split cores are each equalized at equal angular intervals of 120°, so that the balance of the magnetic balance is improved.

The cogging torque of a brushless motor M using a stator core 3 was examined. The stator core 3 had radial direction steps Δd1, inter-teeth clearances Δd2, abutting section clearances Δd3, which were equalized at positions equally spaced by equal angular intervals by 120°.

In this example, the cogging torque of the brushless motor M using the stator core 3 was examined, which stator core 3 had a set of three split cores C (C1, C5, C9) formed by the first core pieces CP1, a set of three split cores C (C2, C6, C10) formed by the second core pieces CP2, a set of three split cores C (C4, C8, C12) formed by the seventh core pieces CP7, and a set of three split cores C (C3, C7, C11) formed by the eighth core pieces CP8. The three split cores C in each set were arranged at equal angular intervals of 120° along the circumferential direction.

As the results of the examination, a cogging torque waveform Tc4 at the split tooth portion Cb of the fourth split core C4, a cogging torque waveform Tc8 at the split tooth portion Cb of the eighth split core C8, and a cogging torque waveform Tc12 at the split tooth portion Cb of the twelfth split core C12 were obtained. The fourth split core C4, the eighth split core C4, and the twelfth split core C12 were all formed by the seventh core pieces CP7.

When the cogging torque waveforms Tc4, Tc8 and Tc12 at three split cores C arranged at equal angular intervals of 120° were synthesized, the cogging torque waveforms Tc4, Tc8, and Tc12 canceled one another, so that the amplitude value of the synthetic wave T was significantly small. In other words, the cogging torque was reduced.

Likewise, the cogging torque can be reduced in a brushless motor M shown in FIG. 11 using a stator core 3 formed by first to twelfth split cores C1 to C12 that are formed by the third core pieces CP3, the fourth core pieces CP4, the ninth core pieces CP9, and the tenth core pieces CP10, and in a brushless motor M shown in FIG. 12 using a stator core 3 formed by first to twelfth split cores C1 to C12 that are formed by the fifth core pieces CP5, the sixth core pieces CP6, the eleventh core pieces CP11, and the twelfth core pieces CP12.

The present embodiment provides the following advantages.

(1) According to the present embodiment, the core pieces CP1 to CP12 are punched from the rolled steel plate 30 by the first punching die 31 and the second punching die 32. Twelve types of split cores C are formed. Each type of the split cores C is formed by laminating a single type of the core pieces CP1 to CP12 that have been punched by the same one of the punching dies 31, 32 at the same position along the widthwise direction of the rolled steel plate 30. The twelve types of split cores C are divided into three groups, each consisting of three split cores C. The stator core 3 is formed such that, in each group, three split cores C from each of the four types are used, so that the three cores C are arranged at intervals of 120° along the circumferential direction.

Therefore, even if dimensional errors exist are different between split cores C that are formed by different core pieces CP (for example, first, second, seventh, and eighth core pieces CP1, CP2, CP7, and CP8), the radial direction steps Δd1, the inter-teeth clearances Δd2, and the abutting section clearances Δd3 between adjacent split cores C are equalized, so that the balance of the magnetic resistance is improved. As a result, the cogging torque of the brushless motor M is reduced.

(2) According to the present embodiment, the first to twelfth split cores C1 to C12 are formed by using both of core pieces CP punched by the first punching die 31 and core pieces CP punched by the second punching die 32, so as to form a single stator core 3.

That is, no single stator core 3 is formed by using first to twelfth split cores C1 to C12 that are made of only the core pieces produced by the first punching die 31 or by using first to twelfth split cores C1 to C12 that are made of only the core pieces produced by the second punching die 32.

As a result, variation in the characteristics of the manufactured stator cores 3 is reduced. In other words, brushless motors M of uniform characteristics can be manufactured.

Further, since the core pieces CP are produced using multiple punching dies, that is, the first punching die 31 and the second punching die 32, the manufacture efficiency is improved.

(3) Further, according to the present embodiment, for example, the first and second core pieces CP1 and CP2 punched by the first punching die 31, and the seventh and eighth core pieces CP7 and CP8 are punched by the second punching die 32 at positions in the rolled steel plate 30 that are adjacent to the positions of the first and second core pieces CP1 and CP2 (the same position as the first and second core pieces CP1 and CP2 with respect to the widthwise direction of the rolled steel plate 30). The first and second core pieces CP1 and CP2 and the seventh and eighth core pieces CP7 and CP8 are used to form first to twelfth split cores C1 to C12 to form a single stator core 3.

The first and second core pieces CP1 and CP2, which are punched by the first punching die 31, and the seventh and eight core pieces CP7 and CP8, which are punched by the second punching die 32, are core pieces CP that are punched at positions in the rolled steel plate 30 having similar material stiffness. Accordingly, dimensional errors among the first, second, seventh, and eighth core pieces CP1, CP2, CP7, and CP8 are reduced.

As a result, dimensional errors among split cores C formed by respective core pieces CP are reduced. This increases the roundness of the annular stator core 3, which improves the balance of the magnetic resistance and reduces the cogging torque of the brushless motor M.

(4) According to the present embodiment, each coupled pair of the split cores C, for example, the first split core C1 formed of the first core pieces CP1 and the second split core C2 formed of the second core pieces CP2, are formed of the core pieces CP1 and CP2 that have been punched by the same punching die 31 at close positions in the rolled steel plate 30.

That is, adjacent core pieces CP that are punched by the same one of the punching dies 31, 32 are formed into approximate shapes. Since split cores C formed of core pieces CP having approximate shapes are coupled to each other, the radial direction step Δd1, the inter-teeth clearance Δd2, and the abutting section clearance Δd3 between the coupled split cores C are reduced.

(5) According to the present embodiment, one stator core 3 is formed using core pieces CP (CP1, CP2, CP7, CP8) punched in the left area Z1 of the rolled steel plate 30, another stator core 3 is formed using core pieces CP (CP3, CP4, CP9, CP10) punched in the middle area Z2, and another stator core 3 is formed using core pieces CP (CP5, CP6, CP11, CP12) punched in the right area Z3.

Core pieces CP that are punched in areas Z1, Z2, and Z3, which have significantly different material stiffness, are relatively largely different in shapes. However, such core pieces CP having relatively great difference in shapes are not used to produce one stator core 3. Therefore, a single stator core 3 does not have split cores C having relatively large difference in shapes. As a result, the radial direction step Δd1, the inter-teeth clearance Δd2, and the abutting section clearance Δd3 are reduced in each stator core 3.

(6) According to the present embodiment, the core pieces CP punched from the first area A by the first punching die 31 and the core pieces CP punched from the second area B by the second punching die 32 are punched in such a manner that the tooth piece portions CPb face each other.

In each core piece CP, the length of the inner circumference of the arcuate distal end of the tooth piece portion CPb is less than the length of the outer circumference of the arcuate annular piece portion CPa. Therefore, the stiffness of the rolled steel plate 30 after core pieces CP are punched by the first and second punching dies 31, 32 is significantly greater in the vicinity of the tooth piece portions CPb than in the vicinity of the annular piece portions CPa.

Accordingly, in a pair of core pieces CP that are punched at facing positions, dimensional errors between the tooth piece portions CPb is less than those between the annular piece portion CPa. Therefore, when the split cores are arranged to be annular, the roundness of the stator core is improved.

The above embodiment may be modified as follows.

The stator core 3 may be formed using core pieces CP1 to CP12 located in positions shown in FIG. 15.

That is, first to twelfth split cores C are formed using core pieces CP in the first area A of the rolled steel plate 30, or four adjacent core pieces CP (CP1 to CP4) that belong to the left area Z1 and the middle area Z2. Also, first to twelfth split cores C are formed using core pieces CP in the second area B, or four adjacent core pieces CP (CP7 to CP10) that belong to the left area Z1 and the middle area Z2. Further, core pieces CP (CP5, CP6, CP11, and CP12) in the first and second areas A and B and located in the right area Z3 are used to form first to twelfth split cores C.

Alternatively, the stator core 3 may be formed using core pieces CP1 to CP12 located in the positions shown in FIG. 16.

That is, core pieces CP (CP1, CP2, CP7, and CP8) in the first and second areas A and B of the rolled steel plate 30 and located in the left area Z1 are used to form first to twelfth split cores C. Also, first to twelfth split cores C are formed using core pieces CP in the first area A, or core pieces CP (CP3 to CP6) that belong to the middle area Z2 and the right area Z3. Further, first to twelfth split cores C are formed using core pieces CP in the second area B, or core pieces CP (CP9 to CP12) that belong to the middle area Z2 and the right area Z3.

In the above embodiment, the core pieces CP punched from the first area A and the core pieces CP punched from the second area B are punched in such a manner that the tooth piece portions CPb face each other. Instead, the core pieces CP punched from the first area A and the core pieces CP punched from the second area B are punched in such a manner that the annular piece portions CPa face each other.

In the above embodiment, the first and second punching dies 31, 32 are capable of punching six core pieces along the transverse direction of the rolled steel plate 30. Instead, punching dies may be employed that simultaneously punches two, four, eight or any number of core pieces.

In the above embodiment, the present invention is applied to a stator core 3 having first to twelfth split cores C1 to C12, that is, twelve split cores C. However, the present invention may be applied to stator cores 3 having any number of split cores C, for example, a stator core 3 having six split cores C or a stator core 3 having twenty four split cores C.

In the above embodiment, the core pieces CP punched from the first area A by the first punching die 31 and the core pieces CP punched from the second area B by the second punching die 32 are punched in such a manner that the tooth piece portions CPb face each other. However, the core pieces CP may be punched to be oriented in any direction as needed.

In the above embodiment, the first core piece group G1 and the second core piece group G2 are punched from the first area A and the second area B by the first punching die 31 and the second punching die 32, respectively. However, a single punching die may be used for punching the first and second core piece groups G1, G2 from the first and second areas A and B.

As a matter of course, three or more punching dies may be provided such that each punching die punches the assigned one of the first and second core piece groups G1 and G2.

In the above embodiment, the shapes of the core pieces CP forming the split cores C are the same. However, the split cores C may be formed of several types of core pieces CP having different shapes.

For example, core pieces CPA shown in FIG. 17 may be prepared that have an arcuate projection 13 and an arcuate recess 15 formed in the reversed ends of the annular piece portion CPa with respect to those of the core piece CP shown in FIG. 5. In this case, the core pieces CP shown in FIG. 5 and the core pieces CPA are laminated alternately to form a single split core C as shown in FIG. 17.

The arcuate projection 13 of each core piece CP and the arcuate projection 13a of each core piece CPA project in the circumferential direction by different amounts. Therefore, when a single split core C is formed by alternately laminating the core pieces CP, CPA, a space is formed at either end of the split annular portion Ca of each split core C by the arcuate projections 13 (13a), the arcuate projections 13 (13a), and the arcuate recesses 15. The space receives the arcuate projections 13 (13a) of the core pieces CP of the circumferentially adjacent split core C.

Accordingly, when the split cores C are assembled to form an annular shape, flux leakage at the coupling sections between the split cores C is reduced. This in turn reduces the magnetic resistance.

In the above embodiment, the split cores C are pivotably coupled together via the insulators 19. However, split cores having coupling and pivoting portion may be used. Alternatively, both of split cores and insulators may have a coupling and pivoting portions.

In the above embodiment, the core pieces CP are punched from the first and second areas A and B such that the distal ends of the tooth pieces CPb face each other in the longitudinal direction of the rolled steel plate. Instead, the core pieces CP may be punched such that the tooth piece portions CPb in the first and second areas A and B are alternately arranged (in a zigzag fashion), so that each tooth piece portion CPb in the second area B is located between a pair of tooth piece portions CPb in the first area A with respect to the widthwise direction of the rolled steel plate.

We claim:

1. A method for manufacturing an armature core, wherein a plurality of split cores, which are formed by laminating core pieces produced through punching by punching dies, are coupled together to form an annular shape as a whole, so as to manufacture one armature core, the method comprising:
    guiding a steel plate along a first direction, the steel plate having at least first areas and second areas that have a predetermined width and extend in a second direction perpendicular to the first direction, wherein the first areas and the second areas are alternately arranged along the first direction;
    simultaneously punching a plurality of first core pieces from each first area;
    simultaneously punching a plurality of second core pieces from each second area;
    preparing a plurality of sets of the split cores, each set having three split cores, so as to form one armature core, the three split cores in each set being formed by a plurality of core pieces that have been punched by the same part of the same punching die and have the same shape; and
    arranging the three split cores in each set at intervals of 120° in the circumferential direction, the three split cores arranged at intervals of 120° in the circumferential direction having the same shape.

2. The manufacturing method according to claim 1, wherein the three split cores in each set are formed by the first core pieces or the second core pieces that are punched at the same positions in the steel plate with respect to the second direction.

3. The manufacturing method according to claim 2, wherein the split cores in said plurality of sets required for forming one armature core at least include three sets of the split cores formed by either first core pieces or second core pieces punched at a first position of the steel plate with respect to the second direction, and three sets of the split cores formed by either first core pieces or second core pieces punched at a second position of the steel plate with respect to the second direction, the second position being adjacent to the first position.

4. The manufacturing method according to claim 3, wherein all the split cores in said plurality of sets required for forming one armature core are formed only by the first core pieces or only by the second core pieces.

5. The manufacturing method according to claim 2, wherein the split cores in said plurality of sets required for forming one armature core include a plurality of sets of three split cores, each split core being formed by either first core pieces or second core pieces punched at a plurality of positions of the steel plate, the positions being adjacent to each other with respect to the second direction.

6. The manufacturing method according to claim 2, wherein the split cores in said plurality of sets required for forming one armature core at least include three sets of the split cores formed by first core pieces punched at a first position of the steel plate with respect to the second direction, and three sets of the split cores formed by second core pieces punched at the first position of the steel plate with respect to the second direction.

7. The manufacturing method according to claim 6, wherein the split cores in said plurality of sets required for forming one armature core further include three sets of the split cores formed by first core pieces punched at a second position of the steel plate adjacent to the first position with respect to the second direction, and three sets of the split cores formed by second core pieces punched at the second position with respect to the second direction.

8. The manufacturing method according to claim 1, wherein the first core pieces are simultaneously punched from each first area by a first punching die, and the second core pieces are simultaneously punched from each second area by a second punching die, which is different from the first punching die.

9. The manufacturing method according to claim 8, wherein each of the first and second punching dies punches six core pieces simultaneously from a corresponding area.

10. The manufacturing method according to claim 1, wherein each core piece has a tooth piece portion, the first core pieces and the second core pieces being punched in adjacent first and second areas in such a manner that the tooth piece portions of the first and second core pieces face each other.

11. A method for manufacturing an armature core, comprising:
    guiding a steel plate along a first direction, the steel plate having a plurality of areas that have a predetermined width and extend in a second direction perpendicular to the first direction;
    simultaneously punching six core pieces from each of the areas using each of a plurality of punching dies;
    forming a plurality of split cores by laminating core pieces produced through punching by the punching dies;
    forming one armature core by coupling twelve of the split cores together to form an annular shape as a whole;
    preparing a plurality of sets of the split cores, each set having three split cores, so as to form one armature core, the three split cores in each set being formed by a plurality of core pieces that have been punched by the same part of the same punching die and have the same shape; and
    arranging the three split cores in each set at intervals of 120° in the circumferential direction, the three split cores arranged at intervals of 120° in the circumferential direction having the same shape.

12. The manufacturing method according to claim 11, wherein number of the punching dies is two.

* * * * *